(12) United States Patent
Itani et al.

(10) Patent No.: US 11,583,831 B2
(45) Date of Patent: Feb. 21, 2023

(54) MIXED CERIUM- AND ZIRCONIUM-BASED OXIDE

(71) Applicant: RHODIA OPERATIONS, Paris (FR)

(72) Inventors: Lama Itani, Courbevoie (FR); Julien Hernandez, Antony (FR); Barry William Luke Southward, Chicago, IL (US)

(73) Assignee: RHODIA OPERATIONS, Paris (FR)

( * ) Notice: Subject to any disclaimer, the term of this patent is extended or adjusted under 35 U.S.C. 154(b) by 66 days.

(21) Appl. No.: 16/472,848

(22) PCT Filed: Dec. 22, 2017

(86) PCT No.: PCT/EP2017/084379
§ 371 (c)(1),
(2) Date: Jun. 21, 2019

(87) PCT Pub. No.: WO2018/115436
PCT Pub. Date: Jun. 28, 2018

(65) Prior Publication Data
US 2020/0188885 A1    Jun. 18, 2020

(30) Foreign Application Priority Data
Dec. 23, 2016 (EP) ..................... 16206893

(51) Int. Cl.
*B01J 23/10* (2006.01)
*B01D 53/94* (2006.01)
(Continued)

(52) U.S. Cl.
CPC ............ *B01J 23/10* (2013.01); *B01D 53/945* (2013.01); *B01J 35/0026* (2013.01); *B01J 35/026* (2013.01); *B01J 35/1014* (2013.01); *B01J 35/1061* (2013.01); *B01J 37/0236* (2013.01); *B01J 37/031* (2013.01); *B01J 37/04* (2013.01); *B01J 37/06* (2013.01); *B01J 37/088* (2013.01); *C01G 25/006* (2013.01); *C01G 27/006* (2013.01); *B01D 2255/2061* (2013.01);
(Continued)

(58) Field of Classification Search
CPC ...... B01J 23/10; B01J 35/0026; B01J 35/026; B01J 35/1014; B01J 35/1061; B01J 37/0236; B01J 37/031; B01J 37/04; B01J 37/06; B01J 37/088; B01D 53/945; C01G 25/006; C01G 27/006
See application file for complete search history.

(56) References Cited

U.S. PATENT DOCUMENTS

| | | | |
|---|---|---|---|
| 2013/0336864 A1* | 12/2013 | Zheng ................. | B01J 35/1019 423/213.5 |
| 2014/0141967 A1* | 5/2014 | Schermanz ............ | C01G 25/02 502/304 |
| 2018/0304235 A1* | 10/2018 | Harris ..................... | B01J 37/04 |

* cited by examiner

*Primary Examiner* — Colin W. Slifka
*Assistant Examiner* — Michael Forrest
(74) *Attorney, Agent, or Firm* — Osha Bergman Watanabe & Burton LLP (57) ABSTRACT

The present invention relates to a mixed oxide of aluminium, of zirconium, of cerium, of lanthanum and optionally of at least one rare-earth metal other than cerium and lanthanum that makes it possible to prepare a catalyst that retains, after severe ageing, a good thermal stability and a good catalytic activity. The invention also relates to the process for preparing this mixed oxide and also to a process for treating exhaust gases from internal combustion engines using a catalyst prepared from this mixed oxide.

16 Claims, 2 Drawing Sheets

(51) Int. Cl.
    *B01J 35/00*         (2006.01)
    *B01J 35/02*         (2006.01)
    *B01J 35/10*         (2006.01)
    *B01J 37/02*         (2006.01)
    *B01J 37/03*         (2006.01)
    *B01J 37/04*         (2006.01)
    *B01J 37/06*         (2006.01)
    *B01J 37/08*         (2006.01)
    *C01G 25/00*       (2006.01)
    *C01G 27/00*       (2006.01)

(52) U.S. Cl.
    CPC ............... *B01D 2255/2063* (2013.01); *B01D 2255/2065* (2013.01); *B01D 2255/2066* (2013.01); *B01D 2255/2092* (2013.01); *B01D 2255/20715* (2013.01); *B01D 2255/407* (2013.01); *B01D 2255/908* (2013.01); *B01D 2255/9202* (2013.01); *B01D 2255/9205* (2013.01); *B01D 2255/9207* (2013.01); *C01P 2002/50* (2013.01); *C01P 2002/72* (2013.01); *C01P 2004/61* (2013.01); *C01P 2006/11* (2013.01); *C01P 2006/12* (2013.01); *C01P 2006/16* (2013.01)

Fig. 3: Table of relative pressures (p/p₀)

| | | | |
|---|---|---|---|
| 0.0500 | 0.7400 | 0.9920 | 0.9100 |
| 0.0800 | 0.7800 | 0.9940 | 0.9000 |
| 0.1000 | 0.8200 | 0.9950 | 0.8900 |
| 0.1400 | 0.8600 | 0.9940 | 0.8600 |
| 0.1500 | 0.8900 | 0.9936 | 0.8200 |
| 0.1750 | 0.9000 | 0.9930 | 0.7800 |
| 0.2000 | 0.9100 | 0.9915 | 0.7400 |
| 0.2250 | 0.9200 | 0.9900 | 0.7000 |
| 0.2500 | 0.9300 | 0.9875 | 0.6600 |
| 0.2750 | 0.9400 | 0.9850 | 0.6200 |
| 0.3000 | 0.9500 | 0.9840 | 0.5800 |
| 0.3200 | 0.9550 | 0.9825 | 0.5400 |
| 0.3400 | 0.9600 | 0.9800 | 0.5000 |
| 0.3800 | 0.9650 | 0.9750 | 0.4600 |
| 0.4200 | 0.9700 | 0.9700 | 0.4200 |
| 0.4600 | 0.9750 | 0.9650 | 0.3800 |
| 0.5000 | 0.9800 | 0.9600 | 0.3400 |
| 0.5400 | 0.9825 | 0.9550 | 0.2700 |
| 0.5800 | 0.9840 | 0.9500 | 0.2000 |
| 0.6200 | 0.9850 | 0.9400 | |
| 0.6600 | 0.9875 | 0.9300 | |
| 0.7000 | 0.9900 | 0.9200 | |

MIXED CERIUM- AND ZIRCONIUM-BASED OXIDE

This application is a U.S. national stage entry under 35 U.S.C. § 371 of International Application No. PCT/EP2017/084379 filed Dec. 22, 2017, which claims priority to European application No. EP 16206893.6 filed on Dec. 23, 2016. The entire contents of these applications are explicitly incorporated herein by this reference.

TECHNICAL FIELD

The present invention relates to a mixed oxide of aluminium, of zirconium, of cerium, of lanthanum and optionally of at least one rare-earth metal other than cerium and lanthanum that makes it possible to prepare a catalyst that retains, after severe ageing, a good thermal stability and a good catalytic activity. The invention also relates to the process for preparing this mixed oxide and also to a process for treating exhaust gases from internal combustion engines using a catalyst prepared from this mixed oxide.

Technical Problem

"Multifunctional" catalysts are currently used for the treatment of exhaust gases from internal combustion engines (motor vehicle afterburning catalysis). Multifunctional is understood to mean catalysts capable of carrying out not only oxidation, in particular of carbon monoxide and hydrocarbons present in exhaust gases, but also reduction, in particular of nitrogen oxides also present in these gases ("three-way" catalysts).

The catalyst results from the interaction of a precious metal (for example Pd, Pt, Rh) with a washcoat on which it is dispersed. The washcoat is typically obtained from an aqueous dispersion formed from two pulverulent solid materials, a mixed cerium- and zirconium-based oxide and a mineral material which is often alumina. The mixed cerium- and zirconium-based oxide acts as an oxygen reserve (or "OSC" for Oxygen-Storage-Capacity).

One alternative to the physical mixing of the two solid materials for the preparation of the washcoat consists in forming a composite based on aluminium, cerium and zirconium via a precipitation technique. The composite thus prepared is more homogeneous than the physical mixture and makes it possible, during the preparation of the washcoat, to forgo the physical mixing step. The mixed oxide according to the invention may therefore replace the cerium- and zirconium-based compositions conventionally used and also all or some of the alumina that is mixed with said compositions.

The composite as described in claim 1 is targeted at such a compromise. Other characteristics, details and advantages of the invention will become even more fully apparent on reading the description and the appended figures.

DEFINITIONS

The data relating to the porosities were obtained by mercury or nitrogen porosimetry techniques making it possible to define the pore volume (V) as a function of the pore diameter (D). The mercury intrusion porosimetry is obtained in accordance with the standard ASTM D 4284-83 ("Standard method for determining pore volume distribution of catalysts by mercury intrusion porosimetry"). It is possible to use a Micromeritics Autopore IV 9500 device provided with a powder penetrometer by complying with the instructions recommended by the manufacturer.

Specific surface area is understood to mean the BET specific surface area obtained by nitrogen adsorption. It is determined using the BRUNAUER-EMMETT-TELLER method. This method is in particular described in the journal "The Journal of the American Chemical Society, 60, 309 (1938)". It is possible to comply with the recommendations of the standard ASTM D3663-03. Hereinafter, the abbreviation $S_{T(° C.)/x(h)}$ is used to denote the specific surface area of a composition, obtained by the BET method, after calcination of the composition at a temperature T, expressed in ° C., for a period of time of x hours. For example; $S_{1000° C./4 h}$ denotes the BET specific surface area of a composition after calcination thereof at 1000° C. for 4 h. The calcinations for a given temperature and a given period of time correspond, unless otherwise indicated, to calcinations in air at a temperature hold over the period of time indicated.

In order to determine the specific surface areas and the pore distributions by nitrogen adsorption, use may be made of a device from the Tristar II range (3000 or 3020) from Micromeritics while complying with the instructions recommended by the manufacturer. The samples are pretreated for 2 h at 200° C.

From the mercury or nitrogen porosity data, it is possible to obtain the curve (C) representing the derivative (dV/d log D) of the function V as a function of log D. The derivative curve (C) may exhibit one or more peaks each located at a diameter denoted by D. It is also possible to obtain, from these data, the following characteristics relating to the porosity of the mixed oxide:

pore volume in ml/g (denoted by $V_{total}$) obtained from the porosimetry data as read on the cumulative curve;

pore volume in ml/g developed by the pores, the size of which is less than or equal to 100 nm ($V_{<100\ nm}$) obtained from the porosimetry data as read on the cumulative curve.

A rare-earth metal is understood to mean the elements of the group consisting of yttrium and the elements of the Periodic Table with an atomic number between 57 and 71 inclusive.

The proportions are given by weight of oxide, unless otherwise indicated. It is considered that, for these calculations, the cerium oxide is in the form of ceric oxide and the oxides of the other rare-earth metals are in the form $REM_2O_3$, REM denoting the rare-earth metal, with the exception of praseodymium, expressed in the form $Pr_6O_{11}$. Zirconium oxide and hafnium oxide are in the form $ZrO_2$ and $HfO_2$. Aluminium is present in the form $Al_2O_3$.

It is specified, for the continuation of the description, that, unless otherwise indicated, in the ranges of values which are given, the values at the limits are included.

DETAILED DESCRIPTION

As regards the mixed oxide according to the invention, the latter is a mixed oxide of aluminium, of zirconium, of cerium, of lanthanum and optionally of at least one rare-earth metal other than cerium and lanthanum (denoted REM), the proportions by weight of these elements, expressed as oxide equivalent, with respect to the total weight of the mixed oxide being as follows:
- between 20% and 60% of aluminium;
- between 15% and 35% of cerium;
- between 1% and 10% of lanthanum;
- between 0 and 10% for the rare-earth metal other than cerium and lanthanum, on condition that if the mixed oxide comprises more than one rare-earth metal other than cerium and lanthanum, this proportion applies to each of these rare-earth metals and that the sum of the proportions of these rare-earth metals remains less than 15%;
- between 15% and 50% of zirconium;

characterized in that after having been calcined at a temperature of 1100° C. for 5 hours:
- the x-ray diagram of the mixed oxide has, for the crystalline phase composed of cerium zirconium oxide, only a single peak; the maximum of which is located at a 2θ angle of between 28° and 32°;
- the average size of the crystallites of the crystalline phase composed of cerium zirconium oxide is at most 30 nm;
- the BET specific surface area of the mixed oxide is at least 35 m²/g;

and in that after having been calcined at a temperature of 950° C. for 4 hours:
- the pore volume of the mixed oxide, developed by the pores, the size of which is less than or equal to 100 nm obtained from the nitrogen porosimetry data is greater than or equal to 0.30 ml/g;
- the total pore volume of the mixed oxide, obtained from mercury porosimetry data, is less than or equal to 2.0 ml/g.

In the mixed oxide, the abovementioned elements Al, Ce, La, REM and Zr are generally present in the form of oxides. The mixed oxide may therefore be defined as a mixture of oxides. However, it is not excluded for these elements to be able to be present at least partly in the form of hydroxides or of oxyhydroxides. The proportions of these elements may be determined using analytical techniques conventional in laboratories, in particular plasma torch and X-ray fluorescence. The proportions of these elements are given by weight of oxide equivalent with respect to the total weight of the mixed oxide. The mixed oxide comprises the above-mentioned elements in the proportions indicated but it may also comprise other elements, such as, for example, impurities. The impurities may originate from the starting materials or from the starting reactants used. The total proportion of the impurities expressed by weight with respect to the total weight of the mixed oxide is generally less than 2%, or even less than 1%. The mixed oxide may also comprise hafnium, which is generally present in association with zirconium in natural ores. The proportion of hafnium with respect to the zirconium depends on the ore from which the zirconium is extracted. The Zr/Hf proportion by weight in some ores may thus be of the order of 50/1. Thus, for example, baddeleyite contains approximately 98% of zirconium oxide for 2% of hafnium oxide. Like zirconium, hafnium is generally present in the oxide form. However, it is not excluded for it to be able to be present at least partly in the hydroxide or oxyhydroxide form. The proportion by weight of hafnium in the mixed oxide may be less than or equal to 2.0%, expressed as oxide equivalent with respect to the total weight of the mixed oxide.

The proportions of the impurities and of the hafnium may be determined using inductively coupled plasma mass spectrometry (ICP-MS).

In the mixed oxide according to the invention, the above-mentioned elements are intimately mixed, which distinguishes the mixed oxide from a simple mechanical mixture of oxides in solid form. The intimate mixture is obtained by the precipitation of the constituent elements of the mixed oxide in the presence of aluminium hydrate.

The proportion by weight of cerium is between 15% and 35%, more particularly between 20% and 33%, more particularly still between 20% and 30%, or even between 25% and 30%.

The proportion by weight of lanthanum is between 1% and 10% and more particularly between 1% and 6%, or even between 2% and 6%.

The mixed oxides may also comprise one or more rare-earth metals other than cerium or lanthanum (REM). The rare-earth metal may for example be chosen from yttrium, neodymium or praseodymium. The mixed oxide may for example contain only a single REM in a proportion of between 0 and 10%. The mixed oxide may also contain more than one REM and in this case the proportion 0-10% then applies to each REM and the sum of the proportions of these rare-earth metals REM remains less than 15%, or less than 10%, or even less than 8%.

The mixed oxide also comprises zirconium. The proportion by weight of zirconium may be between 15% and 50%, more particularly between 20% and 45%, more particularly still between 25% and 40%, or even between 30% and 40%.

The mixed oxide also comprises aluminium. The proportion by weight of aluminium may be between 20% and 60%, more particularly between 25% and 60%, more particularly still between 25% and 50%, or even between 30% and 40%.

Advantageously, the mixed oxide comprises aluminium and zirconium, the total proportion of these two elements expressed in oxide form being greater than or equal to 50%.

The mixed oxide is characterized by the fact that after calcination at 1100° C. for 5 hours, it comprises only a single crystalline phase composed of cerium zirconium oxide. The crystalline phase composed of cerium zirconium oxide comprises the two oxides of cerium and of zirconium and may also comprise lanthanum and optionally rare-earth metal(s) other than cerium and lanthanum. Thus, the x-ray diagram of the mixed oxide has, for this crystalline phase, only a single peak, the maximum of which is located at a 2θ angle of between 28° and 32° (source: CuKα1, λ=1.5406 Angstrom). This reflects the fact that the crystallites composed of cerium zirconium oxide are homogeneous in terms of composition, even after an intensive heat treatment at 1100° C. This homogeneity is generally expressed by good cerium reducibility properties or else by a good oxygen mobility.

Furthermore, after calcination at 1100° C. for 5 hours, the mean size of the crystallites of this crystalline phase is at most 30 nm, or at most 25 nm, or even at most 20 nm. The mean size of the crystallites is determined by the x-ray diffraction technique and corresponds to the size of the coherent domain calculated from the width of the diffraction line 2θ between 28° and 32° using the Scherrer model:

$$t = \frac{k \cdot \lambda}{\sqrt{H^2 - s^2} \cdot \cos\theta}$$

t: crystallite size
k: shape factor equal to 0.9
λ (lambda): wavelength of the incident beam (λ=1.5406 Angstrom)
H: full width at half maximum of the diffraction line
s: width due to the instrumental optics defect which depends on the instrument used and on the 2θ (theta) angle;
θ: Bragg angle After having been calcined at 1100° C. for 5 hours, the mixed oxide may also have a ratio R<1.0, R being determined from the x-ray diffraction data via the formula below:

$$R = \frac{I\ Al2O3}{I\ CZ} \times \frac{100}{Al2O3\ wt\ \%}$$

in which:
$I_{Al2O3}$ denotes the intensity of the signal of the gamma-alumina; the maximum of which is located at the 2θ angle=67°±1;
$I_{CZ}$ denotes intensity of the signal of the crystalline phase composed of cerium zirconium oxide; the maximum of which is located at a 2θ angle of between 28° and 32°;
$Al_2O_3$ wt % denotes the proportion by weight of aluminium expressed as oxide equivalent.

The mixed oxide according to the invention also has a large specific surface area. The surface area $S_{1100°\ C./5\ h}$ may be at least 35 m²/g, more particularly at least 38 m²/g, more particularly still at least 40 m²/g. This surface area may reach 65 m²/g for an aluminium proportion of greater than 50%, or greater than 55%. This surface area may reach 60 m²/g for an aluminium proportion of less than 50%.

The surface area $S_{950°\ C./4\ h}$ may be at least 75 m²/g and more particularly at least 80 m²/g. This surface area may reach 110 m²/g.

After calcination at 950° C. for 4 hours, the pore volume developed by the pores, the size of which is less than or equal to 100 nm, obtained from the nitrogen porosimetry data is greater than or equal to 0.30 ml/g, or to 0.35 ml/g; or even to 0.40 ml/g. This pore volume may reach 1.00 ml/g.

Furthermore, after calcination at 950° C. for 4 hours, the total pore volume obtained from the mercury porosimetry data may be less than or equal to 2.0 ml/g, or less than or equal to 1.65 ml/g, or to 1.45 ml/g, or even to 1.25 ml/g. This total pore volume may be equal to 0.70 ml/g. The pore distribution of the mixed oxide determined by mercury porosimetry may have, after calcination at 950° C. for 4 hours, in the domain of the pores having a diameter of less than 100 nm, a peak with diameter at the peak $D_p$ of between 10 and 30 nm. In this pore range, this peak may be unique.

The mixed oxide also has, after calcination at 950° C. for 4 hours, a powder bulk density of greater than or equal to 0.25, or to 0.4, or else to 0.5, or else to 0.6. The conditions for measuring this density are given below. This density may reach 1.0.

A particular mixed oxide according to the invention based on aluminium, on zirconium, on cerium, on lanthanum and optionally on at least one rare-earth metal other than cerium and lanthanum (denoted by REM), the proportions by weight of which are the following:
between 27% and 33% of aluminium,
between 24% and 32% of cerium;
between 3% and 6% of lanthanum;
between 3% and 6% for the rare-earth metal other than cerium and lanthanum, on condition that if the mixed oxide comprises more than one rare-earth metal other than cerium and lanthanum, this proportion applies to each of these rare-earth metals;
between 31% and 37% of zirconium;
and having the following characteristics:
after calcination at a temperature of 1100° C. for 5 hours, the mean size of the crystallites of the crystalline phase composed of cerium zirconium oxide is at most 20 nm, more particularly between 13 and 20 nm;
after calcination at a temperature of 950° C. for 4 hours, the pore volume of the mixed oxide, developed by the pores, the size of which is less than or equal to 100 nm obtained from the nitrogen porosimetry data is greater than or equal to 0.35 ml/g.

The surface area $S_{1100°\ C./5\ h}$ of this mixed oxide may be between 35 and 42 m²/g. For this mixed oxide, the powder bulk density after calcination at 950° C. for 4 hours may be between 0.4 and 0.6. This mixed oxide may be based on aluminium, on zirconium, on cerium, on lanthanum, on yttrium and on neodymium.

Another particular mixed oxide according to the invention based on aluminium, on zirconium, on cerium, on lanthanum and optionally on at least one rare-earth metal other than cerium and lanthanum (denoted by REM), the proportions of which are the following:
between 40% and 60% of aluminium;
between 15% and 25% of cerium;
between 2% and 6% of lanthanum;
between 3% and 6% for the rare-earth metal other than cerium and lanthanum, on condition that if the mixed oxide comprises more than one rare-earth metal other than cerium and lanthanum, this proportion applies to each of these rare-earth metals;
between 15% and 30% of zirconium:
and having the following characteristics:
after calcination at a temperature of 1100° C. for 5 hours, the BET specific surface area of the mixed oxide is at least 50 m²/g, more particularly between 50 and 65 m²/g;
after calcination at a temperature of 950° C. for 4 hours, the pore volume of the mixed oxide, developed by the pores, the size of which is less than or equal to 100 nm obtained from the nitrogen porosimetry data is greater than or equal to 0.40 ml/g, more particularly between 0.40 and 0.70 ml/g.

For this other mixed oxide, after calcination at a temperature of 1100° C. for 5 hours, the mean size of the crystallites of the crystalline phase composed of cerium zirconium oxide may be between 15 and 30 nm. After calcination at a temperature of 950° C. for 4 hours, the total pore volume of this other mixed oxide obtained from mercury porosimetry data may be between 1.20 and 1.70 ml/g. This other mixed oxide may be based on aluminium, on zirconium, on cerium, on lanthanum, on yttrium and on neodymium.

For the two particular mixed oxides described above, the proportion 3-6% relating to REM applies in the case where the mixed oxide comprises only a single REM. In the case where the mixed oxide comprises more than one REM, this proportion 3-6% applies to each of these REMs.

The characteristics of the mixed oxide according to the invention as it has been described above (including in the form of the two particular mixed oxides) apply to a mixed oxide as it is obtained before, but also after, grinding. The term "grinding" is understood to mean the mechanical operation that consists in dividing a solid. The ground or unground mixed oxide may be in the form of a powder having a mean diameter $d_{50}$ of between 1.0 and 50.0 µm, or between 5.0 and 40.0 μm, $d_{50}$ being determined by laser diffraction over a volume distribution.

$d_{50}$ corresponds to the median diameter as conventionally understood in statistics, determined from a volume distribution of the particle diameters obtained by means of the laser diffraction technique. It is thus the value for which, on the cumulative curve by volume of the distribution, 50% of the particles have a diameter greater than $d_{50}$ and 50% of the particles have a diameter less than $d_{50}$. Use may be made of the Coulter Counter LS according to the manufacturer's recommendations and using the manufacturer's software in order to obtain such a distribution. The measurement may be carried out in water optionally in the presence of a dispersant.

As regards the process for preparing the mixed oxide according to the invention, this comprises the following steps:
- (a1) an acidic aqueous solution of precursors of cerium, of zirconium; of lanthanum and optionally of at least one rare-earth metal other than cerium and lanthanum, in which an aluminium hydrate is dispersed; is introduced into a stirred tank containing a basic aqueous solution;
- (a2) the precipitate dispersion obtained at the end of step (a1) is optionally heated;
- (a3) a texturing agent is added to the dispersion obtained in step (a1) or in step (a2);
- (a4) the solid of the dispersion of step (a3) is recovered by solid/liquid separation and is optionally washed;
- (a5) the solid obtained at the end of step (a4) is optionally dried;
- (a6) the solid obtained at the end of step (a4) or of step (a5) is calcined at a temperature of between 700° C. and 1100° C. to result in the mixed oxide;
- (a7) the mixed oxide obtained in step (a6) is optionally ground.

In step (a1), use is made of an aqueous solution comprising precursors of cerium, of zirconium, of lanthanum and optionally of one or more rare-earth metals other than cerium and lanthanum ("solution of precursors") in which an aluminium hydrate, for example an aluminium monohydrate, is dispersed. This mixture is denoted hereinafter by the term "precursor mixture".

For a given element, the term "precursor" denotes a salt or a compound of the element in question. The precursor may for example be a nitrate or a chloride of this element. The zirconium precursor may be crystalline zirconyl nitrate. A zirconium precursor may also be obtained by dissolving zirconium basic carbonate or zirconium hydroxide with nitric acid. This acid attack may preferably be carried out with a $NO_3^-/Zr$ molar ratio of between 1.4 and 2.3. Thus, a usable zirconium nitrate solution, resulting from the attack of the carbonate, may have a concentration, expressed as $ZrO_2$, of between 260 and 280 g/l. For example, the zirconyl nitrate solution used in example 1 resulting from the attack of the carbonate has a concentration of 268 g/l.

For the source of cerium, it is possible to use, for example, a $Ce^{III}$ or $C^{IV}$ salt, such as $Ce^{III}$ chloride, $Ce^{III}$ or $Ce^{IV}$ nitrate or ceric ammonium nitrate, which are very particularly suitable here. Use may be made of cerous or ceric nitrate. An aqueous ceric nitrate solution may, for example, be obtained by reaction of nitric acid with a ceric oxide hydrate prepared conventionally by reaction of a solution of a cerous salt, for example cerous nitrate, and of an ammonia solution in the presence of aqueous hydrogen peroxide solution. Use may also be made, preferably, of a ceric nitrate solution obtained according to the process of electrolytic oxidation of a cerous nitrate solution as described in the document FR-A-2570087, which constitutes in this instance an advantageous starting material. It is possible to obtain, with this process, a ceric nitrate solution with a $Ce^{IV}$/total amount of Ce molar ratio of greater than or equal to 0.90, which may constitute an advantageous starting material.

The lanthanum precursor may be lanthanum chloride or nitrate. The precursor of the rare-earth metal other than cerium and lanthanum may be a nitrate or chloride. For example, it may be praseodymium nitrate, neodymium nitrate, yttrium chloride $YCl_3$ or yttrium nitrate $Y(NO_3)_3$.

According to one embodiment, the solution of precursors is prepared only from precursors in the form of nitrates.

According to another embodiment, the solution of precursors comprises a zirconium chloride, a cerium salt, a lanthanum salt and optionally a salt of one or more rare-earth metals other than cerium and lanthanum. More particularly, according to this embodiment, the solution of precursors is prepared only from precursors in the form of chlorides. Still according to this embodiment, it is possible for the solution of precursors to also comprise a sulfate anion. The $SO_4^{2-}/(Ce+Zr)$ molar ratio in the solution of precursors may be between 0.4 and 2.0, preferably between 0.7 and 1.5. The $SO_4^{2-}$ anions may be provided by the addition of sulfuric acid or of a sulfate salt.

The solution of precursors has a certain initial free acidity which may be adjusted by the addition of a base or of an acid. The adjustment of the free acidity may help to disperse the aluminium hydrate in the aqueous solution while avoiding too large a modification of the physicochemical characteristics of the aluminium hydrate. It is, however, equally possible to use an initial solution effectively having a certain free acidity as mentioned above, and solutions which will have been more or less intensively neutralized beforehand. This neutralization may be carried out by addition of a basic compound to the solution so as to limit this acidity but while avoiding any precipitation. This basic compound may, for example, be an ammonia solution or even a solution of alkali metal (sodium, potassium, and the like) hydroxides. Use may advantageously be made of an ammonia solution.

Aluminium hydrate is added to the solution of precursors, with stirring, in order to obtain the precursor mixture in the form of a dispersion.

The precursor mixture contains $Ce^{III}$ and/or $Ce^{IV}$. It will be noted that it is possible to involve during the process before step (a5), an oxidizing agent, for example aqueous hydrogen peroxide solution. The aqueous hydrogen peroxide solution is preferably added to the precursor mixture or to the solution of precursors. The $H_2O_2/Ce^{III}$ molar ratio may be between 0.0 and 8.0, preferably between 0.1 and 3.0. The addition of aqueous hydrogen peroxide solution makes it possible to reduce the amount of texturing agent added in step (a3) in order to obtain the mixed oxide according to the invention.

It is advantageous to use salts with a purity of at least 99.0% by weight and more particularly of at least 99.5% by weight.

The solution of precursors may be obtained by dissolution, in water, of the precursors in any order or else by mixing solutions of precursors.

In step (a1), the precursor mixture is introduced into a stirred tank containing a basic aqueous solution so as to obtain a precipitate (so-called "reverse" precipitation). The basic compound dissolved in the basic aqueous solution may be a hydroxide, for example an alkali metal or alkaline-earth metal hydroxide. Use may also be made of secondary, tertiary or quaternary amines, as well as of ammonia. As in the example described below, use may be made of an aqueous ammonia solution. As in the example, use may be made of an aqueous ammonia solution, for example with a concentration of 2 mol/l.

The basic compound may be used with a stoichiometric excess relative to all of the cations of the solution of precursors in order to ensure an optimal and complete precipitation. The stoichiometric excess is preferably at least 20 mol % relative to all of the cations of the solution of precursors.

A dispersion of a precipitate is obtained at the end of step (a1).

Regarding the Aluminium Hydrate

The aluminium hydrate may be a boehmite or a pseudoboehmite, optionally doped with at least one dopant, it being possible for the dopant to be, for example, lanthanum or praseodymium. The aluminium hydrate may be in the form of powder or of an aqueous suspension. The powder may have been dried by spray drying. The aluminium hydrate may generally be described by the formula $AlOOH \cdot xH_2O$ ($0 \leq x \leq 1$).

The boehmite may be obtained according to the teachings of U.S. Pat. No. 4,154,812, in particular of example 1 thereof. The boehmite may also be obtained by an "alkoxide" route. This route, used industrially by the company Sasol and developed by the companies Condea and Vista, uses precursors of aluminium alcoholate type which are derived as byproducts from a Ziegler/Alfol process or directly derived from an alcoholic attack or digestion of aluminium in metal form. These precursors are hydrolysed in the presence of water, generally at a temperature above 80° C., typically 90° C., so as to quantitatively precipitate the aluminium hydrate. After separation of a phase containing the alcohol released and of an aqueous phase containing the aluminium hydrate, the aqueous phase is matured at 98° C. for 16 h. A lanthanum precursor (nitrate or acetate for example) may be added to the aqueous phase. The aqueous phase is then dried; for example by spray drying. A boehmite of this type may be synthesized by following the teachings of example B1 of application US 2013/017947.

It is also possible to use an aluminium hydrate having a particular porosity which is now described and which is denoted hereinafter by aluminium hydrate H. This aluminium hydrate H is based on a boehmite and may optionally comprise at least one additional element selected from the group formed by lanthanum, praseodymium or a mixture of the two elements, characterized in that after having been calcined in air at a temperature of 900° C. for 2 h; it has:
- a pore volume in the domain of the pores having a size of less than or equal to 20 nm (denoted by $VP_{20\ nm}\text{-}N_2$), such that $VP_{20\ nm}\text{-}N_2$:
  - is greater than or equal to $10\% \times VPT\text{-}N_2$, more particularly greater than or equal to $15\% \times VPT\text{-}N_2$, or even greater than or equal to $20\% \times VPT\text{-}N_2$, or even greater than or equal to $30\% \times VPT\text{-}N_2$;
  - is less than or equal to $60\% \times VPT\text{-}N_2$;
- a pore volume in the domain of the pores having a size of between 40 and 100 nm (denoted by $VP_{40\text{-}100\ nm}\text{-}N_2$), such that $VP_{40\text{-}100\ nm}\text{-}N_2$ is greater than or equal to $20\% \times VPT\text{-}N_2$, more particularly greater than or equal to $25\% \times VPT\text{-}N_2$; or even greater than or equal to $30\% \times VPT\text{-}N_2$;
- $VPT\text{-}N_2$ denoting the total pore volume of the aluminium hydrate after calcination in air at 900° C. for 2 h;
- the pore volumes being determined by the nitrogen porosimetry technique.

The term "boehmite" denotes; in European nomenclature and as is known, the gamma oxyhydroxide ($\gamma$-AlOOH). In the present application, the term "boehmite" denotes a variety of aluminium hydrate having a particular crystalline form which is known to a person skilled in the art. Boehmite may thus be characterized by x-ray diffraction. The term "boehmite" also covers "pseudoboehmite" which, according to certain authors, only resembles one particular variety of boehmite and which simply has a broadening of the characteristic peaks of boehmite. Boehmite is identified by x-ray diffraction through its characteristic peaks. These are given in the file JCPDS 00-021-1307 (JCPDS=Joint Committee on Powder Diffraction Standards). It will be noted that the apex of the peak (020) may be between 13.0° and 15.0° depending in particular on:
- the degree of crystallinity of the boehmite;
- the size of the crystallites of the boehmite.

Reference may be made to Journal of Colloidal and Interface Science 2002, 253, 308-314 or to *J. Mater. Chem.* 1999, 9, 549-553 in which it is stated, for a certain number of boehmites, that the position of the peak varies depending on the number of layers in the crystal or on the size of the crystallites. This apex may more particularly be between 13.5° and 14.5°, or between 13.5° and 14.485°.

The aluminium hydrate H may optionally comprise at least one additional element selected from the group formed by lanthanum, praseodymium or a mixture of the two elements. The proportion of this element or the total proportion of these elements may be between 0% and 15% by weight, more particularly between 0% and 10% by weight, more particularly still between 0% and 8%. This proportion may be between 2% and 8%. This proportion is given by weight of the element(s) expressed in oxide form relative to the total weight of the elements Al, La and/or Pr themselves also expressed in oxide form. For the calculation of this proportion it is considered that the lanthanum oxide is in the form $La_2O_3$, that the praseodymium oxide is in the form $Pr_6O_{11}$ and that the aluminium oxide is in the form $Al_2O_3$. Thus, an aluminium hydrate H comprising lanthanum in a proportion of 7% is such that it contains the equivalent of 7% of $La_2O_3$ and the equivalent of 93% of $Al_2O_3$. It is possible to determine the proportion of additional element(s) by calcining the aluminium hydrate in air so as to convert it into alumina and into oxide(s) of the additional element(s), then by attacking the product thus calcined, for example with a concentrated nitric acid solution, so as to dissolve the elements thereof in a solution which may then be analysed by techniques known to person skilled in the art, such as for example ICP.

The boehmite contained in the aluminium hydrate H may have a mean size of the crystallites of at most 6.0 nm, or even of at most 4.0 nm, more particularly still of at most 3.0 nm. The mean size of the crystallites is determined by the x-ray diffraction technique and corresponds to the size of the coherent domain calculated from the full width at half maximum of the line (020).

The aluminium hydrate H may be in the form of a mixture of a boehmite, identifiable as was described above by the x-ray diffraction technique, and of a phase that is not visible in x-ray diffraction, in particular an amorphous phase. The aluminium hydrate H may have a % of crystalline phase (boehmite) which is less than or equal to 60%, more particularly less than or equal to 50%. This % may be between 40% and 55%, or between 45% and 55%, or between 45% and 50%. This % is determined in a manner known to a person skilled in the art. It is possible to use the following formula to determine this %: % crystallinity=intensity of the peak (120)/intensity of the peak (120) of the reference×100 in which the intensity of the peak (120) of the aluminium hydrate and the intensity of the peak (120) of a reference are compared. The reference used in the present application is the product corresponding to example B1 of application US 2013/017947. The intensities measured correspond to the surface areas of the peaks (120) above the baseline. These intensities are determined on the diffractograms relative to a baseline taken over the 2θ angle range between 5.0° and 90.0°. The baseline is determined automatically using the software for analysing the data of the diffractogram.

The aluminium hydrate H has a particular porosity. Thus, after calcination in air at 900° C. for 2 hours, it has a pore volume in the domain of the pores having a size of less than or equal to 20 nm (denoted by $VP_{20\ nm}\text{-}N_2$), such that $VP_{20\ nm}\text{-}N_2$ is greater than or equal to $20\% \times VPT\text{-}N_2$, more particularly greater than or equal to $25\% \times VPT\text{-}N_2$, or even greater than or equal to $30\% \times VPT\text{-}N_2$. Furthermore, $VP_{20\ nm}\text{-}N_2$ is less than or equal to $60\% \times VPT\text{-}N_2$.

Furthermore, after calcination in air at 900° C. for 2 hours, the aluminium hydrate H has a pore volume in the domain of the pores having a size of between 40 and 100 nm (denoted by $VP_{40\text{-}100\ nm}\text{-}N_2$), such that $VP_{40\text{-}100\ nm}\text{-}N_2$ is greater than or equal to $15\% \times VPT\text{-}N_2$, more particularly greater than or equal to $20\% \times VPT\text{-}N_2$, or even greater than or equal to $25\% \times VPT\text{-}N_2$, or even greater than or equal to $30\% \times VPT\text{-}N_2$. Furthermore, $VP_{40\text{-}100\ nm}\text{-}N_2$ may be less than or equal to $65\% \times VPT\text{-}N_2$.

After calcination in air at 900° C. for 2 hours, the aluminium hydrate H may have a total pore volume ($VPT\text{-}N_2$) of between 0.65 and 1.20 ml/g, more particularly between 0.70 and 1.15 ml/g, or between 0.70 and 1.10 ml/g. It will be noted that the pore volume thus measured is developed predominantly by the pores of which the diameter is less than or equal to 100 nm.

The aluminium hydrate H may have a specific surface area of at least 200 m²/g, more particularly at least 250 m²/g. This specific surface area may be between 200 and 400 m²/g.

The pore volumes that are given in the present application are determined by the nitrogen porosimetry technique. For the porosity or specific surface area measurements, the samples are pre-treated at high temperature and/or under vacuum in order to eliminate the volatile surface species (such as for example $H_2O$, etc.). Heating at 200° C. for 2 hours may for example be applied to the sample.

Moreover, after calcination in air at 900° C. for 2 hours, the aluminium hydrate H may have a (BET) specific surface area of at least 130 m²/g, more particularly of at least 150 m²/g. This specific surface area may be between 130 and 220 m²/g. After calcination in air at 940° C. for 2 hours, followed by calcination in air at 1100° C. for 3 hours, the aluminium hydrate H may have a (BET) specific surface area of at least 80 m²/g, more particularly of at least 100 m²/g. This specific surface area may be between 80 and 120 m²/g. When the aluminium hydrate H comprises at least one additional element as described above, the aluminium hydrate could have a high thermal resistance. Thus, after calcination in air at 940° C. for 2 hours, followed by calcination in air at 1200° C. for 5 hours, the aluminium hydrate may have a (BET) specific surface area of at least 45 m²/g, more particularly of at least 50 m²/g. This specific surface area may be between 45 and 75 m²/g. The expression "after calcination in air at the temperature x° C. for y hours, the aluminium hydrate has" is used to characterize the aluminium hydrate even if the property measured (specific surface area or pore volume) is that of the product derived from the calcination of the aluminium hydrate.

The aluminium hydrate H may be obtained by the process comprising the following steps:

(a) introduced into a stirred tank containing an aqueous nitric acid solution are: an aqueous solution (A) comprising aluminium sulfate, optionally the additional element(s) in nitrate form, and nitric acid;

an aqueous sodium aluminate solution (B);

the aqueous solution (A) being introduced continuously throughout step (a) and the rate of introduction of the solution (B) being regulated so that the mean pH of the reaction mixture is equal to a target value of between 4.0 and 6.0, more particularly between 4.5 and 5.5;

(b) when the entire aqueous solution (A) has been introduced, the aqueous solution (B) continues to be introduced until a target pH of between 8.0 and 10.5, preferably between 9.0 and 10.0, is reached;

(c) the reaction mixture is then filtered and the solid recovered is washed with water;

(d) the solid resulting from step (c) is then dried to give the aluminium hydrate H.

The following optional step (a2) of the process is the step of heating the precipitate suspension obtained in step (a1). This heating may be carried out directly on the reaction mixture obtained at the end of step (a1) or on a suspension obtained after separating the precipitate from the reaction mixture of step (a1), optional washing of the precipitate and placing the precipitate back in water. The suspension may be heated to a temperature of at least 60° C. The temperature may be between 60° C. and 180° C. The heating operation may be carried out by introducing the mixture into a closed reactor (of autoclave type). Under the temperature conditions given above, and in an aqueous medium, it may thus be specified, by way of illustration, that the pressure in the closed reactor may vary between a value greater than 1 bar ($10^5$ Pa) and 165 bar ($1.65 \times 10^7$ Pa), preferably between 5 bar ($5 \times 10^5$ Pa) and 165 bar ($1.65 \times 10^7$ Pa). It is also possible to carry out the heating in an open reactor for the temperatures below 100° C. The heating may be carried out either in air or under an atmosphere of inert gas, preferably nitrogen. The duration of the heating may vary within wide limits, for example between 20 min and 48 h, preferably between 20 min and 3 h. Likewise, the rise in temperature is achieved at a rate which is not critical and it is thus possible to reach the set reaction temperature by heating the medium, for example, for between 30 min and 4 h, these values being given entirely by way of indication. The mixture is then cooled to a temperature below 50° C. This cooling is performed by letting the mixture cool naturally or else with the aid of a cooling means known to a person skilled in the art.

It is possible to carry out several heating operations. Thus, the precipitate obtained after the heating step and optionally a washing operation may be redispersed in water and then another heating operation may be carried out on the medium thus obtained. This other heating operation is carried out under conditions, in particular temperature and time conditions, as described above for the first heating operation.

The following step (a3) of the process consists in adding a texturing agent to the dispersion obtained in step (a1) or in step (a2), the function of which texturing agent is to control the porosity of the mixed oxide. A texturing agent comprises polar chemical groups which interact with the chemical groups at the surface of the precipitate. The texturing agent is removed subsequent to the calcination step (a6).

The texturing agent may be chosen from anionic surfactants, nonionic surfactants, polyethylene glycols and carboxylic acids and the salts thereof, and also surfactants of the carboxymethylated fatty alcohol ethoxylate type. As regards this additive, reference may be made to the teaching of the application WO 98/45212 and use may be made of the surfactants described in this document. Mention may be made, as surfactants of the anionic type, of ethoxycarboxylates, ethoxylated fatty acids, sarcosinates, phosphate esters, sulfates, such as alcohol sulfates, alcohol ether sulfates and sulfated alkanolamide ethoxylates, or sulfonates, such as sulfosuccinates, alkylbenzenesulfonates or alkylnaphthalenesulfonates.

Mention may be made, as nonionic surfactants, of acetylenic surfactants, alcohol ethoxylates, alkanolamides, amine oxides, ethoxylated alkanolamides, long-chain ethoxylated amines, ethylene oxide/propylene oxide copolymers, sorbitan derivatives, ethylene glycol, propylene glycol, glycerol, polyglyceryl esters and the ethoxylated derivatives thereof, alkylamines, alkylimidazolines, ethoxylated oils and alkylphenol ethoxylates. Mention may in particular be made of the products sold under the Igepal®, Dowanol®, Rhodamox® and Alkamide® brands.

As regards the carboxylic acids, use may in particular be made of aliphatic mono- or dicarboxylic acids and, among these, more particularly of saturated acids. Mention may thus in particular be made of formic, acetic, propionic, butyric, isobutyric, valeric, caproic, caprylic, capric, lauric, myristic and palmitic acids. Mention may be made, as dicarboxylic acids, of oxalic, malonic, succinic, glutaric, adipic, pimelic, suberic, azelaic and sebacic acids. Use may also be made of fatty acids and more particularly of saturated fatty acids. They may in particular be saturated linear acids of formula $CH_3-(CH_2)_m-COOH$, m being an integer between 6 and 20, more particularly between 9 and 15. The salts of all the acids mentioned may also be used, in particular the ammonium salts. Mention may more particularly be made, by way of example, of lauric acid and ammonium laurate.

Finally, it is possible to use a surfactant which is chosen from those of the carboxymethylated fatty alcohol ethoxylate type. Product of the carboxymethylated fatty alcohol ethoxylate type is understood to mean the products composed of ethoxylated or propoxylated fatty alcohols comprising, at the chain end, a $CH_2-COOH$ group. These products may correspond to the formula: $R_1-O-(CR_2R_3-CR_4R_5-O)_n-CH_2-COOH$ in which $R_1$ denotes a saturated or unsaturated carbon chain, the length of which is generally at most 22 carbon atoms, preferably at least 12 carbon atoms; $R_2$, $R_3$, $R_4$ and $R_5$ may be identical and represent hydrogen or else $R_2$ may represent a $CH_3$ group and $R_3$, $R_4$ and $R_5$ represent hydrogen; and n is a nonzero integer which may range up to 50 and more particularly between 5 and 15, these values being inclusive. It should be noted that a surfactant may be composed of a mixture of products of the above formula for which $R_1$ may be saturated and unsaturated respectively or else products comprising both $-CH_2-CH_2-O-$ and $-C(CH_3)-CH_2-O-$ groups.

The texturing agent may be added to the dispersion resulting from step (a1) or else from step (a2). It is preferably added to a dispersion, the temperature of which is at most 40° C. The proportion of texturing agent used is generally between 1% and 60%, more particularly between 10% and 50%, this proportion being expressed as percentage by weight of texturing agent relative to the mixed oxide.

In step (a4), the solid of the dispersion of step (a3) is recovered by a solid/liquid separation. Use may for example be made of a vacuum filter, for example of Nutsche type, a centrifugal separation or a filter press. Optionally and preferably, in step (a4) the precipitate is washed after having been separated from the medium in which it was suspended. The washing operation consists in bringing the solid into contact with water. This washing operation may be carried out with water, preferably with water at pH>7, for example aqueous ammonia solution.

The washing operation may consist in circulating water through the solid retained on the filter or else in redispersing the solid in water and in recovering it by solid/liquid separation.

In step (a5), the solid obtained at the end of step (a4) is optionally dried. This step may be carried out for example using a spray dryer.

In step (a6), the solid obtained at the end of step (a4) or of step (a5) is calcined in order to result in the mixed oxide. The solid may be dry or else still wet, that is to say that the solid contains residual water. The calcination makes it possible to develop the crystallinity of the product formed. The specific surface area of the product decreases as the calcination temperature employed increases. The calcination is generally carried out in air but a calcination carried out, for example, under an inert gas or under a controlled (oxidizing or reducing) atmosphere is not excluded. The calcination temperature is generally between 700° C. and 1100° C. This temperature may be between 800° C. and 1100° C., or between 900° C. and 1100° C. The calcination time is adapted to the calcination temperature. Purely by way of indication, it may be at least 2 h, more particularly between 2 and 5 h.

During a step (a6), the mixed oxide which is obtained in step (a5) may be optionally ground in order to obtain a powder with the desired particle size. Use may for example be made of a hammer mill or a mortar mill. The powder may also be screened in order to control the particle size thereof.

The preparation of the mixed oxide according to the invention may be based on the conditions of example 1 given below.

The invention also relates to a mixed oxide capable of being obtained by the process which has just been described.

As regards the use of the mixed oxide according to the invention, this comes within the field of motor vehicle pollution control catalysis. The mixed oxide according to the invention may be used in the manufacture of a catalytic converter, the role of which is to treat motor vehicle exhaust gases. The catalytic converter comprises a catalytically active washcoat prepared from the mixed oxide and deposited on a solid support. The role of the washcoat is to convert, by chemical reactions, certain pollutants of the exhaust gas, in particular carbon monoxide, unburnt hydrocarbons and nitrogen oxides, into products which are less harmful to the environment.

The chemical reactions involved may be the following ones:

$2CO+O_2 \rightarrow 2CO_2$ $2NO+2CO \rightarrow N_2+2CO_2$ $4C_xH_y+(4x+y)O_2 \rightarrow 4x\,CO_2+2y\,H_2O$ The solid support may be a metal monolith, for example FeCralloy, or be made of ceramic. The ceramic may be cordierite, silicon carbide, alumina titanate or mullite. A commonly used solid support consists of a monolith, generally cylindrical, comprising a multitude of small parallel channels having a porous wall. This type of support is often made of cordierite and exhibits a compromise between a high specific surface area and a limited pressure drop.

The washcoat is deposited at the surface of the solid support. The washcoat is formed from a composition comprising the mixed oxide according to the invention as a mixture with at least one mineral material. The mineral material may be chosen from alumina, boehmite or pseudo-boehmite, titanium oxide, cerium oxide, zirconium oxide, silica, spinels, zeolites, silicates, crystalline silicon aluminium phosphates or crystalline aluminum phosphates. The composition may also comprise other additives which are specific to each formulator: $H_2S$ scavenger, organic or inorganic modifier having the role of facilitating the coating, colloidal alumina, and the like. The washcoat thus comprises such a composition. Alumina is a commonly employed mineral material, it being possible for this alumina to optionally be doped, for example with an alkaline-earth metal, such as barium. The washcoat also comprises at least one dispersed precious metal (such as, for example, Pt, Rh or Pd). The amount of precious metal is generally between 1 and 400 g, with respect to the volume of the monolith, expressed in $ft^3$. The precious metal is catalytically active.

In order to disperse the precious metal, it is possible to add a salt of the precious metal to a suspension of the mixed oxide or of the mineral material or of the mixture formed of the mixed oxide and of the mineral material. The salt may, for example, be a chloride or a nitrate of the precious metal (e.g. $Rh^{III}$ nitrate). The water is removed from the suspension, in order to fix the precious metal, the solid is dried and it is calcined in air at a temperature generally of between 300 and 800° C. An example of precious metal dispersion may be found in example 1 of U.S. Pat. No. 7,374,729.

The washcoat is obtained by the application of the suspension to the solid support. The washcoat thus exhibits a catalytic activity and may act as pollution-control catalyst. The pollution-control catalyst may be used to treat exhaust gases from internal combustion engines. The catalytic systems and the mixed oxides of the invention may finally be used as $NO_x$ traps or for promoting the reduction of $NO_x$, even in an oxidizing environment.

For this reason, the invention also relates to a process for treating exhaust gases from internal combustion engines which is characterized in that use is made of a catalytic converter comprising a washcoat as described.

EXAMPLES

BET specific surface areas: the specific surface areas are determined automatically using a Tristar II 3020 device from Micromeritics on samples while complying with the instructions recommended by the manufacturer. The samples are pretreated for 2 h at 200° C. The measurement is carried out on 5 points in the range of relative pressures $p/p_0$ extending from 0.05 to 0.3 inclusive. The equilibrium time for each point is 5 s.

Mercury porosity: use was made of a Micromeritics Autopore IV 9500 device provided with a powder penetrometer while complying with the instructions recommended by the manufacturer. Use may be made of the following parameters: penetrometer used: 3.2 ml; volume of the capillary: 0.412 ml; max. pressure ("head pressure"): 4.68 psi; contact angle: 130°; surface tension of the mercury: 485 dynes/cm; density of the mercury: 13.5335 g/ml. At the start of the measurement, a vacuum of 50 mm Hg is applied to the sample for 5 min. The equilibrium times are as follows: range of the low pressures (1.3-30 psi): 20 s-range of the high pressures (30-60 000 psi): 30 s. Prior to the measurement, the samples are degassed in an oven at 100° C. for a minimum of 15 min.

Nitrogen porosity: use was made of a Tristar II 3020 device from Micromeritics.

Figure 1:
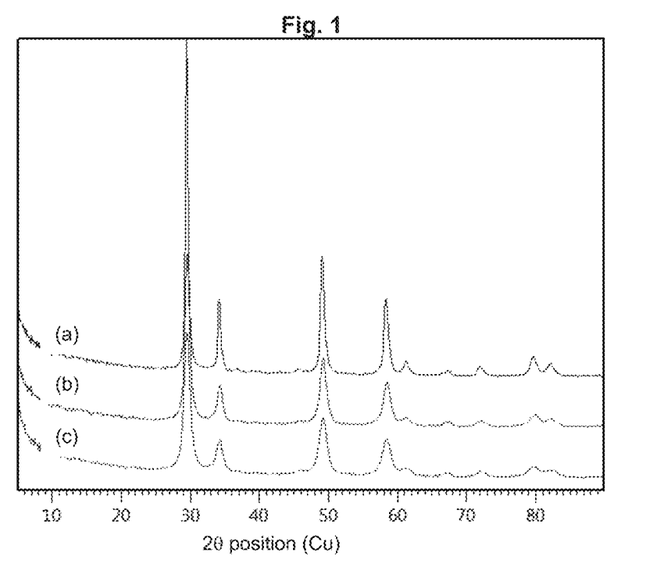
FIG. 1 represents x-ray images (intensity v. 2θ angle) of the mixed oxide from example 1 which was calcined at 3 temperatures: (a) 1100° C. (5 h); (b) 1000° C. (4 h); (c) 950° C. (4 h).
Figure 2:
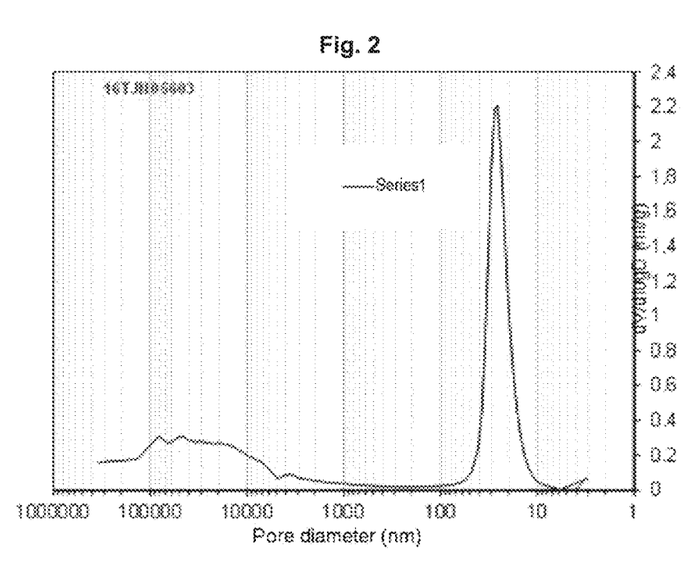
FIG. 2 represents a porogram (mercury porosimetry) of the mixed oxide of example 1 which was calcined at 950° C. for 4 h.
Figure 3:
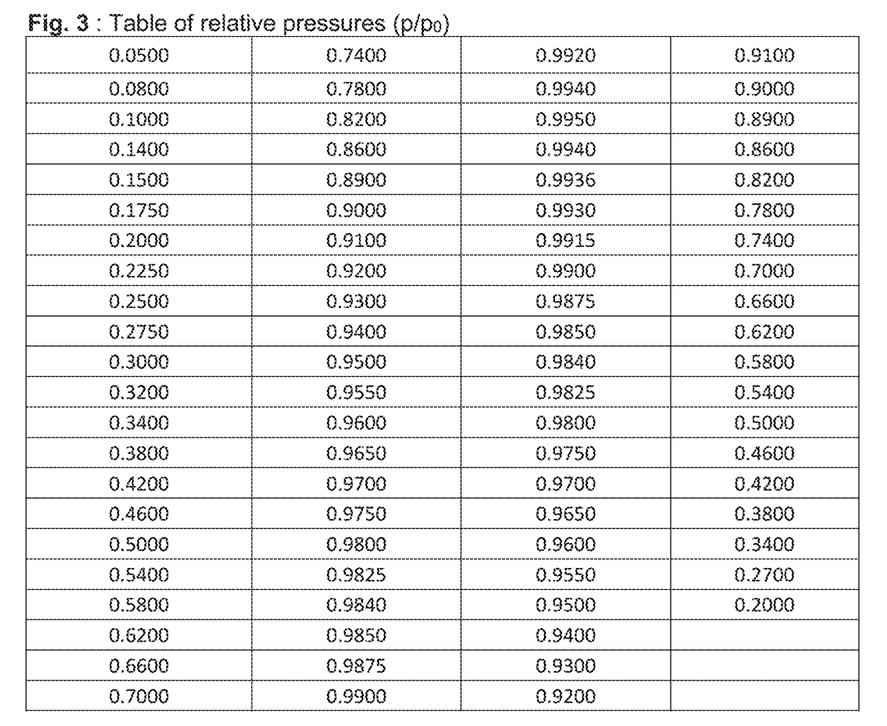
FIG. 3 represents the table of the relative pressures used for determining the nitrogen porosity.

The nitrogen pore distribution measurement is carried out on 85 points using a pressure table (47 points between 0.05 and 0.995 for the adsorption and 38 points in desorption between 0.995 and 0.2) [cf. FIG. 3]. The equilibrium time for a relative pressure of between 0.05 and 0.995 exclusive is 5 s. The equilibrium time for a relative pressure of greater than or equal to 0.995 is 600 s. The tolerances with regard to the pressures are 5 mm Hg for the absolute pressure and 5% for the relative pressure. The $p_0$ value is measured at regular intervals during the analysis (2 h). The Barett, Joyner and Halenda (BJH) method with the Harkins-Jura law is used for determining the mesoporosity. The analysis of the results is carried out on the desorption curve.

X-ray diffraction: in the present application, the x-ray diffraction is obtained with a copper source (CuK$\alpha$1, $\lambda$=1.5406 Angstrom). Use was made of an X'Pert Pro goniometer from Panalytical equipped with a copper source, a spinner sample holder and an X'Celerator 10 detector having an angular width of 2.122°. The device is equipped with a nickel filter at the front and programmable slits so as to illuminate a constant square surface area having sides of 10 mm. Use was made of a 2$\theta$ angle step=0.017° and a recording time of 40 seconds per step and an instrumental width s equal to 2$\theta$=0.07° was determined in the range of the 2$\theta$ angles from 28 to 32°. An acquisition lasts around 30 min.

The intensities are determined on the diffractograms relative to a baseline taken over the 2$\theta$ angle range between 5.0° and 90.0°. The baseline is determined automatically using the software for analysing the data of the diffractogram.

Powder bulk density: the bulk density of the mixed oxide powder corresponds to the weight of a certain amount of powder relative to the volume occupied by this powder:

$$\text{bulk density in g/ml} = \frac{\text{mass of the powder (g)}}{\text{volume of the powder (mL)}}$$

The powder bulk density is determined by the method described below. Firstly, the volume of a cylinder of around 25 ml with no spout is determined precisely. In order to do this, the empty cylinder is weighed (tare T). Distilled water is then poured into the cylinder up to the rim but without exceeding the rim (no meniscus). The cylinder filled with distilled water is weighed (M). The mass of water contained in the cylinder is therefore:

$$W = M - T$$

The calibrated volume of the cylinder is equal to $$V_{cylinder} = \frac{W}{\text{density of the water at the measurement temperature}}.$$

The density of the water is for example 0.99983 g/ml for a measurement temperature of 20° C.

The mixed oxide powder is carefully poured into the empty and dry cylinder using a funnel until the rim of the cylinder is reached. The excess powder is levelled off using a spatula. The powder must not be compacted or tamped down during the filling. The cylinder containing the powder is then weighed.

bulk density (g/ml) =

$$\frac{\text{mass of the cylinder containing the powder (g)} - \text{Tare (g)}}{V_{cylinder}\ (mL)}$$

Particle size: measured using a Coulter Counter LS. The mixed oxide is dispersed in an aqueous solution of sodium hexametaphosphate at a concentration of 10 g/l. The measurement could be carried out after an ultrasound treatment at an energy ranging from 5 to 500 W for a time of 25 seconds to 5 minutes.

Described below are two aluminium hydrates H1 and H2 of H type having a particular porosity that may be used within the context of the invention for preparing the mixed oxide of the invention.

Example H1: Preparation of an Aluminium Hydrate of Composition 93.8% $Al_2O_3$-6.2% $La_2O_3$ In a stirred tank, a solution (A) is prepared by introducing 34.7 kg of deionized water, 10.95 kg of an aluminium sulfate solution having a concentration of 8.31% by weight of alumina ($Al_2O_3$), 1.43 kg of a lanthanum nitrate solution having a concentration of 26.9% by weight of $La_2O_3$ and 4.97 kg of a 68 wt % nitric acid solution. The solution (B) is a sodium aluminate solution having a concentration of 24.9% by weight of alumina ($Al_2O_3$).

Into a stirred reactor (250 rpm; spindle with four blades inclined at 45°), 71 kg of deionized water are introduced. The reactor is then heated until a temperature of 65° C. is reached. This temperature is maintained throughout the reaction. A 69% nitric acid solution is introduced into the stirred reactor until a pH of 3 is reached.

In a step (a), the solution (A) and the solution (B) are simultaneously introduced into the stirred reactor through introduction tubes close to the stirring spindle.

Solution (A) is introduced with a flow rate of 1.05 kg/min. Solution (B) is introduced at a flow rate that makes it possible to achieve a pH of 5 in 3 min. The flow rate of the solution (A) remains constant at 1.05 kg/min and the flow rate of the solution (B) is regulated so as to maintain the pH at a value of 5.1 for 46 min.

In a step (b), the introduction of the solution (A) is stopped and the solution (B) continues to be added until a pH of 10 is reached in 15 minutes.

In step (c), the reaction slurry is then poured over a vacuum filter. At the end of the filtration, the cake is washed with deionized water at 60° C. The cake has a solids content of 11% by weight of oxide ($Al_2O_3$—$La_2O_3$). The cake is then redispersed in deionized water to obtain a suspension having a concentration close to 8% by weight of oxide ($Al_2O_3$—$La_2O_3$).

In step (d), the suspension is spray dried to obtain a dry lanthanum-doped aluminium hydrate powder. The loss on ignition of the powder is obtained by the loss of mass after calcination at 950° C.-2 hours. It is 31.2% by mass. The aluminium hydrate powder contains an equivalent of 64.5% by weight of $Al_2O_3$ and 4.2% by weight of $La_2O_3$. This powder has a BET surface area of 344 m²/g.

Example H2: Preparation of an Aluminium Hydrate of Composition 93.8% $Al_2O_3$-6.2% $La_2O_3$ In a stirred tank, a solution (A) is prepared by introducing 34.7 kg of deionized water; 10.95 kg of an aluminium sulfate solution having a concentration of 8.31% by weight of alumina ($Al_2O_3$), 1.43 kg of a lanthanum nitrate solution having a concentration of 26.9% by weight of $La_2O_3$ and 4.96 kg of a 68% nitric acid solution. The solution (B) is a sodium aluminate solution having a concentration of 24.9% by weight of alumina.

Into a stirred reactor (250 rpm; spindle with four blades inclined at 45°), 71 kg of deionized water are introduced. The reactor is then heated until a temperature of 65° C. is reached. This temperature is maintained throughout the reaction. A 69% nitric acid solution is introduced into the stirred reactor until a pH of 3 is reached.

In a step (a), the solution (A) and the solution (B) are simultaneously introduced into the stirred reactor through introduction tubes close to the stirring spindle. Solution (A) is introduced with a flow rate of 1.05 kg/min. Solution (B) is introduced at a flow rate that makes it possible to achieve a pH of 4.4 in 3 min. The flow rate of the solution (A) remains constant at 1.05 kg/min and the flow rate of the solution (B) is regulated so as to maintain the pH at a value of 4.4 for 46 min.

In a step (b), the introduction of the solution (A) is stopped and the solution (B) continues to be added until a pH of 10 is reached in 15 minutes.

In a step (c), the reaction slurry is then poured over a vacuum filter. At the end of the filtration, the cake is washed with deionized water at 60° C. The cake has a solids content of 13% by weight of oxide ($Al_2O_3$—$La_2O_3$). The cake is then redispersed in deionized water to obtain a suspension having a concentration close to 8% by weight of oxide ($Al_2O_3$—$La_2O_3$).

In a step (d), the suspension is spray dried to obtain a lanthanum-doped aluminium hydrate powder. The loss on ignition of the powder is obtained by the loss of mass after calcination at 950° C.-2 hours. It is 38.5% by mass. The aluminium hydrate powder contains an equivalent of 57.8% by weight of $Al_2O_3$ and 3.8% by weight of $La_2O_3$. This powder has a BET surface area of 259 m²/g.

| | Characterizations of the aluminium hydrates H1 and H2 | | | | | | |
|---|---|---|---|---|---|---|---|
| | BET specific surface area (m²/g) | | X-ray analysis | | Pore volumes after calcination in air at 900° C. - 2 h | | |
| | At the end of step (d) | After calcination in air at 900° C. - 2 h | [020] XRD crystallite size (nm) | Crystallinity [120] XRD peak | VPT-$N_2$ (ml/g) | $VP_{20\ nm}$-$N_2$/ VPT-$N_2$ (%) | $VP_{40\text{-}100\ nm}$-$N_2$/ VPT-$N_2$ (%) |
| H1 | 344 | 181 | 2.8 | 47% | 1.09 | 36% | 32% |
| H2 | 259 | 162 | 2.8 | 44% | 0.70 | 57% | 21% |

Examples 1-9 which follow illustrate the invention.

Example 1: Preparation of a Mixed Oxide $Al_2O_3$ (30%)-$ZrO_2$ (35%)-$CeO_2$ (27%)-$La_2O_3$ (4%)-$Y_2O_3$ (4%) (% by Weight)

A solution based on nitrates of the precursors is prepared by introducing into a tank stirred with the aid of a spindle with four blades inclined at 45°, 361 g of water, 111 g of a zirconyl nitrate solution ($[ZrO_2]=268$ g/l; density 1.415), 56 g of a $Ce^{III}$ nitrate solution ($[CeO_2]=496$ g/l; density 1.714), 7.9 g of a lanthanum nitrate solution ($[La_2O_3]=472$ g/l; density 1.711) and 16 g of an yttrium nitrate solution ($[Y_2O_3]=208.5$ g/l; density 1.392). Next, 2.3 g of 69 wt % nitric acid are added to the solution obtained, in order to obtain the solution of precursors. Added to this solution, by spatula, still while stirring, are 23.3 g of boehmite HP14-L1 sold by Sasol and containing an equivalent of 77.5% by weight of alumina (18 g $Al_2O_3$) and 1% by weight of $La_2O_3$ (0.22 g). The precursor mixture is left stirring until the mixture is obtained in the form of a homogeneous dispersion. Next, 5.3 g of a 9.8 mol/l aqueous hydrogen peroxide solution are added. The precursor mixture is kept stirring.

The precursor mixture is introduced in 60 min into a reactor stirred by a spindle with four blades inclined at 45° (575 rpm), containing 500 ml of a 2 mol/l ammonia solution at ambient temperature.

At the end of the addition of the precursor mixture, the mixture is heated to a temperature of 95° C. and maintained at this temperature for 30 min. The mixture is then cooled to a temperature below 40° C. Added to this cooled mixture are 12 g of lauric acid while stirring at 650 rpm. This stirring is maintained for 30 min.

The mixture is filtered under vacuum, then the cake is washed with 890 g of aqueous ammonia solution of pH=9. The wet cake obtained is then introduced into a muffle furnace. The temperature of the furnace is raised with a rate of 4° C./min until 950° C. is reached, this temperature is then maintained for 4 h. At the end of this calcination in air the mixed oxide is obtained. The mixed oxide recovered is then ground using a mortar.

BET Specific Surface Areas
$S_{950°\ C./4\ h}=72$ m$^2$/g;
$S_{1000°\ C./4\ h}=60$ m$^2$/g;
$S_{110°\ C./5\ h}=39$ m$^2$/g, Crystallite size after calcination in air at 1100° C./4 h: 23.9 nm Powder density after calcination in air at 950° C./4 h: 0.69

Pore volume (pore sizes<100 nm) by $N_2$ porosimetry after calcination in air at 950° C./4 h: $V_{100\ nm,\ N2}=0.58$ ml/g Total pore volume by Hg porosimetry after calcination in air at 950° C./4 h: $V_{total,\ Hg}=1.06$ ml/g Diameter at the peak, determined on the Hg porosimetry curve after calcination in air at 950° C./4 h: $D_p=26$ nm

Example 2: Preparation of a Mixed Oxide $Al_2O_3$ (30%)-$ZrO_2$ (35%)-$CeO_2$ (27%)-$La_2O_3$ (4%)-$Y_2O_3$ (4%) (% by Weight)

A solution based on nitrates of the precursors is prepared by introducing into a tank stirred with the aid of a spindle with four blades inclined at 45°, 357 g of water, 114 g of a zirconyl nitrate solution ($[ZrO_2]=260$ g/l; density 1.406), 56 g of a $Ce^{III}$ nitrate solution ($[CeO_2]=496$ g/l; density 1.714), 4.4 g of a lanthanum nitrate solution ($[La_2O_3]=472$ g/l; density 1.711) and 16 g of an yttrium nitrate solution ($[Y_2O_3]=208.5$ g/l; density 1.392).

Next, 2.3 g of 69 wt % nitric acid are added to the solution obtained, in order to obtain the solution of precursors. Added to this solution, by spatula, still while stirring, are 28 g of aluminium hydrate H1 containing an equivalent of 64.5% by weight of alumina (18 g $Al_2O_3$) and 4.2% by weight of $La_2O_3$ (1.17 g). The mixture is left stirring until the precursor mixture is obtained in the form of a homogeneous dispersion. Next, 5.3 g of a 9.8 mol/l aqueous hydrogen peroxide solution are added. The precursor mixture is kept stirring.

The precursor mixture is introduced in 60 min into a reactor stirred by a spindle with four blades inclined at 45° (575 rpm), containing 500 ml of a 2 mol/l ammonia solution at ambient temperature.

At the end of the addition of the precursor mixture, the mixture is heated to a temperature of 95° C. and maintained at this temperature for 30 min. The mixture is then cooled to a temperature below 40° C. Added to this cooled mixture are 12 g of lauric acid while stirring at 650 rpm. This stirring is maintained for 30 min.

The mixture is filtered under vacuum, then the cake is washed with 720 g of aqueous ammonia solution of pH=9. The wet cake obtained is then introduced into a muffle furnace. The temperature of the furnace is raised with a rate of 4° C./min until 950° C. is reached, this temperature is then maintained for 4 h. At the end of this calcination in air the mixed oxide is obtained. The mixed oxide recovered is then ground using a mortar.

Example 3: Preparation of a Mixed Oxide $Al_2O_3$ (35.6%)-$ZrO_2$ (30%)-$CeO_2$ (24%)-$La_2O_3$ (6.2%)-$Y_2O_3$ (1.2%)-$Pr_6O_{11}$ (3%)

A solution based on nitrates of the precursors is prepared by introducing into a tank stirred with the aid of a spindle with four blades inclined at 45°, 386 g of water, 95 g of a zirconyl nitrate solution ($[ZrO_2]=268.1$ g/l; density 1.415), 49.8 g of a $Ce^{III}$ nitrate solution ($[CeO_2]=496$ g/l; density 1.714), 8.4 g of a lanthanum nitrate solution ($[La_2O_3]=472$ g/l; density 1.711), 4.8 g of an yttrium nitrate solution ($[Y_2O_3]=208.5$ g/l; density 1.392) and 6.2 g of a praseodymium nitrate solution ($[Pr_6O_{11}]=497$ g/l; density 1.725).

Next, 2.0 g of 68 wt % nitric acid are added to the solution obtained, in order to obtain the solution of precursors. Added to this solution, by spatula, still while stirring, are 33.1 g of aluminium hydrate A having 64.5% by weight of alumina (21.3 g $Al_2O_3$) and 4.2% by weight of $La_2O_3$ (1.39 g). The mixture is left stirring until the precursor mixture is obtained in the form of a homogeneous dispersion. Next, 4.69 g of a 9.8 mol/l aqueous hydrogen peroxide solution are added. The precursor mixture is kept stirring.

The precursor mixture is introduced in 60 min into a reactor stirred by a spindle with four blades inclined at 45° (575 rpm), containing 500 ml of a 1.8 mol/l ammonia solution at ambient temperature.

At the end of the addition of the precursor mixture, the reaction medium is heated to a temperature of 95° C. and maintained at this temperature for 30 min. The reaction medium is then cooled to a temperature below 40° C. After cooling, the reaction mixture is again heated in an autoclave to a temperature of 150° C. and maintained at this temperature for 2 h. The reaction medium is then cooled to a temperature below 40° C. Added to this cooled mixture are 23 g of lauric acid while stirring at 500 rpm. This stirring is maintained for 30 min.

The reaction medium is filtered under vacuum, then the cake is washed with 1 l of aqueous ammonia solution (pH=9). The wet cake obtained is then introduced into a muffle furnace. The temperature of the furnace is raised with a rate of 4° C./min up to 950° C., this temperature is maintained for 4 h. At the end of this calcination in air the mixed oxide is obtained. The mixed oxide recovered is then ground using a mortar.

Example 4: Preparation of a Mixed Oxide $Al_2O_3$ (30%)-$ZrO_2$ (35%)-$CeO_2$ (27%)-$La_2O_3$ (4%)-$Y_2O_3$ (4%)

A solution based on nitrates of the precursors is prepared by introducing into a tank stirred with the aid of a spindle with four blades inclined at 45°, 362 g of water, 114 g of a zirconyl nitrate solution ([$ZrO_2$]=260 g/l; density 1.406), 56 g of a $Ce^{III}$ nitrate solution ([$CeO_2$]=496 g/l; density 1.714), 4.4 g of a lanthanum nitrate solution ([$La_2O_3$]=472 g/l; density 1.711) and 16 g of an yttrium nitrate solution ([$Y_2O_3$]=208.5 g/l; density 1.392).

Next, 2.3 g of 69 wt % nitric acid are added to the solution obtained, in order to obtain the solution of precursors. Added to this solution, by spatula, still while stirring, are 28 g of aluminium hydrate H1 containing an equivalent of 64.5% by weight of alumina (18 g $Al_2O_3$) and 4.2% by weight of $La_2O_3$ (1.17 g). The mixture is left stirring until the precursor mixture is obtained in the form of a homogeneous dispersion. The precursor mixture is kept stirring.

The precursor mixture is introduced in 60 min into a reactor stirred by a spindle with four blades inclined at 45° (575 rpm), containing 500 ml of a 2 mol/l ammonia solution at ambient temperature.

At the end of the addition of the precursor mixture, the reaction medium is heated to a temperature of 95° C. and maintained at this temperature for 30 min. The reaction medium is then cooled to a temperature below 40° C. Added to this cooled mixture are 12 g of lauric acid while stirring at 850 rpm. This stirring is maintained for 30 min.

The reaction medium is filtered under vacuum, then the cake is washed with 700 g of aqueous ammonia solution (pH=9). The wet cake obtained is then introduced into a muffle furnace. The temperature of the furnace is raised with a rate of 4° C./min up to 950° C., this temperature is maintained for 4 h. At the end of this calcination in air the mixed oxide is obtained. The mixed oxide recovered is then ground using a mortar.

Example 5: Preparation of a Mixed Oxide $Al_2O_3$ (30%)-$ZrO_2$ (35%)-$CeO_2$ (27%)-$La_2O_3$ (4%)-$Y_2O_3$ (4%)

A solution based on nitrates of the precursors is prepared by introducing into a tank stirred with the aid of a Rushton turbine (200 rpm), 96.5 kg of water, 18.3 kg of a zirconyl nitrate solution ([$ZrO_2$]=272 g/l; density 1.417), 14.98 kg of a $Ce^{IV}$ nitrate solution ([$CeO_2$]=260 g/l; density 1.442), 0.767 kg of a lanthanum nitrate solution ([$La_2O_3$]=472 g/l; density 1.711) and 2.59 kg of an yttrium nitrate solution ([$Y_2O_3$]=217 g/l; density 1.405).

Added to this solution, by shovel, still while stirring, are 5.28 kg of an aluminium hydrate containing an equivalent of 57% by weight of alumina and 3.6% by weight of $La_2O_3$ prepared identically to example H1. The mixture is left stirring until the precursor mixture is obtained in the form of a homogeneous dispersion.

Introduced into a stirred reactor (125 rpm; spindle of Mixell TT type), are 125 l of a 1.6 mol/l ammonia solution. The precursor mixture is introduced in 60 min into the stirred reactor. The process is carried out at ambient temperature.

At the end of the addition of the precursor mixture, the reaction medium is heated to a temperature of 90° C. and maintained at this temperature for 30 min. The suspension is then heated to 150° C. in an autoclave for 120 minutes, then cooled to a temperature of 40° C. Added to this cooled mixture are 4 kg of lauric acid while stirring at 100 rpm. This stirring is maintained for 60 min.

The mixture is filtered on a filter press at a pressure of around 4 bar, then the cake is washed with 250 l of aqueous ammonia solution (pH=9). The cake is then compacted at a pressure of 9.5 bar for 15 min. The wet cake obtained is then introduced into a gas-fired furnace. The product is calcined at 1010° C. for 3 hours. The mixed oxide recovered is then ground in a blade mill of "Forplex" type.

Example 6: Preparation of a Mixed Oxide $Al_2O_3$ (30%)-$ZrO_2$ (35%)-$CeO_2$ (27%)-$La_2O_3$ (4%)-$Y_2O_3$ (4%)

A solution based on nitrates of the precursors is prepared by introducing into a tank stirred with the aid of a spindle with four blades inclined at 45°, 333 g of water, 114 g of a zirconyl nitrate solution ([$ZrO_2$]=260 g/l; density 1.406), 56 g of a $Ce^{III}$ nitrate solution ([$CeO_2$]=496 g/l; density 1.714), 4.4 g of a lanthanum nitrate solution ([$La_2O_3$]=472 g/l, density 1.711) and 16 g of an yttrium nitrate solution ([$Y_2O_3$]=208.5 g/l; density 1.392).

Next, 2.3 g of 69 wt % nitric acid are added to the solution obtained, in order to obtain the solution of precursors. Added to this solution, through the funnel in 30 sec by spatula, still while stirring; are 28 g of aluminium hydrate H1 containing an equivalent of 64.5% by weight of alumina (18 g $Al_2O_3$) and 4.2% by weight of $La_2O_3$ (1.17 g). The mixture is left stirring until the precursor mixture is obtained in the form of a homogeneous dispersion. Next; 31.65 g of a 9.8 mol/l aqueous hydrogen peroxide solution are added. The precursor mixture is kept stirring.

Into a stirred reactor (575 rpm; spindle with four blades inclined at 45°), 500 ml of a 3.1 mol/l ammonia solution are introduced. The precursor mixture is introduced in 60 min into the stirred reactor. The process is carried out at ambient temperature.

At the end of the addition of the precursor mixture, the reaction medium is heated to a temperature of 95° C. and maintained at this temperature for 30 min.

The reaction medium is then cooled to a temperature below 40° C. Added to this cooled mixture are 6 g of lauric acid while stirring at 650 rpm. This stirring is maintained for 30 min.

The reaction medium is filtered under vacuum, then the cake is washed with 760 g of aqueous ammonia solution (pH=9). The wet cake obtained is then introduced into a muffle furnace. The temperature of the furnace is raised with a rate of 4° C./min up to 950° C., this temperature is maintained for 4 h. At the end of this calcination in air the mixed oxide is obtained. The mixed oxide recovered is then ground using a mortar.

Example 7: Preparation of a Mixed Oxide $Al_2O_3$ (30%)-$ZrO_2$ (35%)-$CeO_2$ (27%)-$La_2O_3$ (4%)-$Y_2O_3$ (4%)

A solution based on nitrates of the precursors is prepared by introducing into a tank stirred with the aid of a spindle with four blades inclined at 45°, 342 g of water, 114 g of a zirconyl nitrate solution ($[ZrO_2]_{=268.1}$ g/l; density 1.415), 56 g of a $Ce^{III}$ nitrate solution ($[CeO_2]$=496 g/l; density 1.714), 4.4 g of a lanthanum nitrate solution ($[La_2O_3]$=472 g/l; density 1.711) and 16 g of an yttrium nitrate solution ($[Y_2O_3]$=208.5 g/l; density 1.392).

Next, 2.3 g of 69 wt % nitric acid are added to the solution obtained, in order to obtain the solution of precursors. Added to this solution; through the funnel in 30 sec by spatula, still while stirring, are 27.9 g of aluminium hydrate H1 containing an equivalent of 64.5% by weight of alumina (18 g $Al_2O_3$) and 4.2% by weight of $La_2O_3$ (1.17 g). The mixture is left stirring until the precursor mixture is obtained in the form of a homogeneous dispersion. Next, 31.5 g of a 9.8 mol/l aqueous hydrogen peroxide solution are added. The precursor mixture is kept stirring.

Into a stirred reactor (600 rpm; spindle with four blades inclined at 45°), 500 ml of a 3 mol/l ammonia solution are introduced. The precursor mixture is introduced in 60 min into the stirred reactor. The process is carried out at ambient temperature. At the end of the addition of the precursor mixture, the reaction medium is heated to a temperature of 95° C. and maintained at this temperature for 30 min. The reaction medium is then cooled to a temperature below 40° C. Added to this cooled mixture are 11.8 g of lauric acid while stirring at 500 rpm. This stirring is maintained for 30 min.

The reaction medium is filtered under vacuum, then the cake is washed with 1 l of aqueous ammonia solution (pH=9). The wet cake obtained is then introduced into a muffle furnace. The temperature of the furnace is raised with a rate of 4° C./min up to 950° C., this temperature is maintained for 4 h. At the end of this calcination in air the mixed oxide is obtained. The mixed oxide recovered is then ground using a mortar.

Example 8: Preparation of a Mixed Oxide $Al_2O_3$ (30%)-$ZrO_2$ (35%)-$CeO_2$ (27%)-$La_2O_3$ (4%)-$Y_2O_3$ (4%)

A solution based on nitrates of the precursors is prepared by introducing into a tank stirred with the aid of a spindle with four blades inclined at 45°, 388.4 g of water, 75.8 g of a zirconyl nitrate solution ($[ZrO_2]$=260 g/l; density 1.406), 60.8 g of a $Ce^{IV}$ nitrate solution ($[CeO_2]$=254 g/l; density 1.431), 3 g of a lanthanum nitrate solution ($[La_2O_3]$=472 g/l; density 1.711) and 10.7 g of an yttrium nitrate solution ($[Y_2O_3]$=208.5 g/l; density 1.392).

Added to this solution, by spatula, still while stirring, are 18.6 g of aluminium hydrate H1 containing an equivalent of 64.5% by weight of alumina (12 g $Al_2O_3$) and 4.2% by weight of $La_2O_3$ (0.8 g). The mixture is left stirring until the precursor mixture is obtained in the form of a homogeneous dispersion. The precursor mixture is kept stirring.

Into a stirred reactor (500 rpm; spindle with four blades inclined at 45°), 500 ml of a 4.7 mol/l ammonia solution are introduced. The precursor mixture is introduced in 60 min into the stirred reactor. The process is carried out at ambient temperature. Added to this mixture are 14 g of lauric acid while stirring at 500 rpm. This stirring is maintained for 30 min.

The reaction medium is filtered under vacuum, then the cake is washed with 1 l of aqueous ammonia solution (pH=9). The wet cake obtained is then introduced into a muffle furnace. The temperature of the furnace is raised with a rate of 4° C./min up to 950° C., this temperature is maintained for 4 h. At the end of this calcination in air the mixed oxide is obtained. The mixed oxide recovered is then ground using a mortar.

Example 9: Preparation of a Mixed Oxide $Al_2O_3$ (30%)-$ZrO_2$ (35%)-$CeO_2$ (27%)-$La_2O_3$ (4%)-$Y_2O_3$ (4%)

A solution based on nitrates of the precursors is prepared by introducing into a tank stirred with the aid of a spindle with four blades inclined at 45°, 357 g of water, 114 g of a zirconyl nitrate solution ($[ZrO_2]_{=260}$ g/l; density 1.406), 56 g of a $Ce^{III}$ nitrate solution ($[CeO_2]$=496 g/l; density 1.714), 4.4 g of a lanthanum nitrate solution ($[La_2O_3]$=472 g/l; density 1.711) and 16 g of an yttrium nitrate solution ($[Y_2O_3]$=208.5 g/l; density 1.392).

Next, 2.3 g of 69 wt % nitric acid are added to the solution obtained, in order to obtain the solution of precursors. Added to this solution, by spatula, still while stirring, are 31.1 g of aluminium hydrate H2 containing an equivalent of 57.8% by weight of alumina (18 g A1803) and 3.8% by weight of $La_2O_3$ (1.18 g). The mixture is left stirring until the precursor mixture is obtained in the form of a homogeneous dispersion. Next, 5.3 g of a 9.8 mol/l aqueous hydrogen peroxide solution are added. The precursor mixture is kept stirring.

Into a stirred reactor (600 rpm; spindle with four blades inclined at 45°), 500 ml of a 2 mol/l ammonia solution are introduced. The precursor mixture is introduced in 60 min into the stirred reactor. The process is carried out at ambient temperature. At the end of the addition of the precursor mixture, the reaction medium is heated to a temperature of 95° C. and maintained at this temperature for 30 min. The reaction medium is then cooled to a temperature below 40° C.

Added to this cooled mixture are 12 g of lauric acid while stirring at 500 rpm. This stirring is maintained for 30 min.

The reaction medium is filtered under vacuum, then the cake is washed with 1 l of aqueous ammonia solution (pH=9). The wet cake obtained is then introduced into a muffle furnace. The temperature of the furnace is raised with a rate of 4° C./min up to 950° C., this temperature is maintained for 4 h. At the end of this calcination in air the mixed oxide is obtained. The mixed oxide recovered is then ground using a mortar.

Counterexample 1: Preparation of a Mixed Oxide $Al_2O_3$ (30%)-$ZrO_2$ (35%)-$CeO_2$ (27%)-$La_2O_3$ (4%)-$Y_2O_3$ (4%)

In this comparative example, the basic aqueous solution is introduced into the precursor mixture whereas in the process of the invention, the precursor mixture is introduced into a basic aqueous solution.

A solution based on nitrates of the precursors is prepared by introducing into a stirred reactor (600 rpm; spindle with four blades inclined at 45°) 362 g of water, 114 g of a zirconyl nitrate solution ($[ZrO_2]$=260 g/l; density 1.406), 56 g of a Cell' nitrate solution ($[CeO_2]$=496 g/l; density 1.714), 4.4 g of a lanthanum nitrate solution ($[La_2O_3]$=472 g/l; density 1.711) and 16 g of an yttrium nitrate solution ($[Y_2O_3]$=208.5 g/l; density 1.392).

Next, 2.3 g of 69 wt % nitric acid are added to the solution obtained, in order to obtain the solution of precursors. Added to this solution, by spatula, still while stirring, are 28 g of aluminium hydrate H1 containing an equivalent of 64.5% by weight of alumina (18 g $Al_2O_3$) and 4.2% by weight of La$_2$O$_3$ (1.17 g). The mixture is left stirring until the precursor mixture is obtained in the form of a homogeneous dispersion.

Introduced into this mixture of precursors are 500 ml of a 2 mol/l ammonia solution. The ammonia solution is introduced in 60 min into the stirred reactor (575 rpm; spindle with four blades inclined at 45°). The process is carried out at ambient temperature.

At the end of the addition of the base, the reaction medium is heated to a temperature of 95° C. and maintained at this temperature for 30 min. The reaction medium is then cooled to a temperature below 40° C. Added to this mixture are 12 g of lauric acid while stirring at 650 rpm. This stirring is maintained for 30 min.

The reaction medium is filtered under vacuum, then the cake is washed with 640 g of aqueous ammonia solution (pH=9). The wet cake obtained is then introduced into a muffle furnace. The temperature of the furnace is raised with a rate of 4° C./min up to 950° C., this temperature is maintained for 4 h. At the end of this calcination in air the mixed oxide is obtained. The mixed oxide recovered is then ground using a mortar.

Counterexample 2: Preparation of a Mixed Oxide Al$_2$O$_3$ (30%)-ZrO$_2$ (35%)-CeO$_2$ (27%)-La$_2$O$_3$ (4%)-Y$_2$O$_3$ (4%)

In this comparative example, no texturing agent is used.

A solution based on nitrates of the precursors is prepared by introducing into a tank stirred with the aid of a spindle with four blades inclined at 45°, 342 g of water, 114 g of a zirconyl nitrate solution ([ZrO$_2$]=268.1 g/l; density 1.415), 56 g of a Ce$^{III}$ nitrate solution ([CeO$_2$]=496 g/l; density 1.714), 4.4 g of a lanthanum nitrate solution ([La$_2$O$_3$]=472 g/l; density 1.711) and 16 g of an yttrium nitrate solution ([Y$_2$O$_3$]=208.5 g/l; density 1.392).

Next, 2.3 g of 69 wt % nitric acid are added to the solution obtained, in order to obtain the solution of precursors. Added to this solution, by spatula, still while stirring, are 28 g of aluminium hydrate H1 containing an equivalent of 64.5% by weight of alumina (18 g Al$_2$O$_3$) and 4.2% by weight of La$_2$O$_3$ (1.17 g). The mixture is left stirring until the precursor mixture is obtained in the form of a homogeneous dispersion. Next, 31.65 g of a 9.8 mol/l aqueous hydrogen peroxide solution are added. The precursor mixture is kept stirring.

Into a stirred reactor (575 rpm; spindle with four blades inclined at 45°), 500 ml of a 3 mol/l ammonia solution are introduced. The precursor mixture is introduced in 60 min into the stirred reactor. The process is carried out at ambient temperature.

At the end of the addition of the precursor mixture, the reaction medium is heated to a temperature of 95° C. and maintained at this temperature for 30 min. The reaction medium is then cooled to a temperature below 40° C.

The reaction medium is filtered under vacuum, then the cake is washed with 1 l of aqueous ammonia solution (pH=9). The wet cake obtained is then introduced into a muffle furnace. The temperature of the furnace is raised with a rate of 4° C./min up to 950° C., this temperature is maintained for 4 h. At the end of this calcination in air the mixed oxide is obtained. The mixed oxide recovered is then ground using a mortar.

Counterexample 3: Preparation of a Mixed Oxide Al$_2$O$_3$ (30%)-ZrO$_2$ (35%)-CeO$_2$ (27%)-La$_2$O$_3$ (4%)-Y$_2$O$_3$ (4%)

In this comparative example, no texturing agent is used.

A solution based on nitrates of the precursors is prepared by introducing into a tank stirred with the aid of a spindle with four blades inclined at 45°, 388.4 g of water, 75.8 g of a zirconyl nitrate solution ([ZrO$_2$]=260 g/l; density 1.406), 60.8 g of a CO' nitrate solution ([CeO$_2$]=254 g/l; density 1.431), 3.0 g of a lanthanum nitrate solution ([La$_2$O$_3$]=472 g/l; density 1.711) and 10.7 g of an yttrium nitrate solution ([Y$_2$O$_3$]=208.5 g/l; density 1.392).

Added to this solution, by spatula, still while stirring, are 18.6 g of aluminium hydrate H1 containing an equivalent of 64.5% by weight of alumina (12 g Al$_2$O$_3$) and 4.2% by weight of La$_2$O$_3$ (0.8 g). The mixture is left stirring until the precursor mixture is obtained in the form of a homogeneous dispersion. The precursor mixture is kept stirring.

Into a stirred reactor (500 rpm; spindle with four blades inclined at 45°), 500 ml of a 4.7 mol/l ammonia solution are introduced. The precursor mixture is introduced in 60 min into the stirred reactor. The process is carried out at ambient temperature.

The reaction medium is filtered under vacuum, then the cake is washed with 1 l of aqueous ammonia solution (pH=9). The wet cake obtained is then introduced into a muffle furnace. The temperature of the furnace is raised with a rate of 4° C./min up to 950° C., this temperature is maintained for 4 h. At the end of this calcination in air the mixed oxide is obtained. The mixed oxide recovered is then ground using a mortar.

Counterexample 4: Preparation of a Mixed Oxide Al$_2$O$_3$(30%)-ZrO$_2$ (35%)-CeO$_2$ (27%)-La$_2$O$_3$ (4%)-Y$_2$O$_3$ (4%)

In this comparative example, the aluminium hydrate is dispersed in the basic aqueous solution whereas in the process of the invention; it is dispersed in an acidic aqueous solution.

A solution based on nitrates of the precursors is prepared by introducing into a tank stirred with the aid of a spindle with four blades inclined at 45°, 394.2 g of water, 75.8 g of a zirconyl nitrate solution ([ZrO$_2$]=260 g/l; density 1.406), 60.8 g of a Ce$^{IV}$ nitrate solution ([CeO$_2$]=254 g/l; density 1.431), 3.0 g of a lanthanum nitrate solution=472 g/l; density 1.711) and 10.7 g of an yttrium nitrate solution ([Y$_2$O$_3$]=208.5 g/l: density 1.392). The solution based on nitrates of precursors is kept stirring.

Into a stirred reactor (500 rpm; spindle with four blades inclined at 45°), 500 ml of a 4.7 mol/l ammonia solution are introduced. Added to this solution, by spatula, still while stirring, are 18.6 g of aluminium hydrate H1 containing an equivalent of 64.5% by weight of alumina (12 g Al$_2$O$_3$) and 4.2% by weight of La$_2$O$_3$ (0.8 g). Added in 60 min to this mixture, still while stirring, is the solution based on nitrates of the precursors. The process is carried out at ambient temperature.

At the end of the addition of the solution based on nitrates of the precursors, the reaction medium is heated in an autoclave to a temperature of 100° C. and maintained at this temperature for 30 min. The reaction medium is then cooled to a temperature below 40° C. Added to this mixture are 14 g of lauric acid while stirring at 500 rpm. This stirring is maintained for 30 min.

The reaction medium is filtered under vacuum, then the cake is washed with 1 l of aqueous ammonia solution (pH=9). The wet cake obtained is then introduced into a muffle furnace. The temperature of the furnace is raised with a rate of 4° C./min up to 950° C., this temperature is maintained for 4 h. At the end of this calcination in air the mixed oxide is obtained. The mixed oxide recovered is then ground using a mortar.

It will be noted that in the comparative examples, the specific surface area at 1100° C. is smaller than for the examples according to the invention.

TABLE I

| Ex. | BET specific surface areas* (m²/g) | | | Crystallite size after calcination | Powder density after calcination | $V_{100\ nm,\ N2\ (ml/g)}$* | $V_{total,\ Hg\ (ml/g)}$* |
|---|---|---|---|---|---|---|---|
| | $S_{950°\ C./4\ h}$ | $S_{1000°\ C./4\ h}$ | $S_{1100°\ C./5\ h}$ | at 1100° C./5 h* | at 950° C./4 h* | | |
| Ex. 1 | 72 | 60 | 39 | 23.9 | 0.69 | 0.58 | 1.06 |
| Ex. 2 | 82 | 68 | 40 | 19.0 | 0.75 | 0.45 | 0.90 |
| Ex. 3 | 83 | 70 | 44 | 19.0 | 0.38 | 0.76 | 1.60 |
| Ex. 4 | 79 | 65 | 37 | 18.0 | 0.90 | 0.36 | 0.78 |
| Ex. 5 | / | 64 | 41 | 28.0 | 0.40 | 0.56 | 1.41 |
| Ex. 6 | 82 | 69 | 39 | 18.0 | 0.70 | 0.46 | 0.94 |
| Ex. 7 | 87 | 70 | 40 | 19.0 | 0.60 | 0.61 | 1.13 |
| Ex. 8 | / | / | 45 | 21.0 | / | 0.82 | 1.01 |
| Ex. 9 | 79 | 66 | 41 | 19.0 | 0.69 | 0.53 | / |
| Cex. 1 | 70 | 58 | 32 | 27.0 | 1.10 | 0.30 | / |
| Cex. 2 | 77 | 61 | 32 | 20.0 | 1.00 | 0.28 | 0.63 |
| Cex. 3 | / | / | 31 | 23.0 | / | 0.22 | 0.61 |
| Cex. 4 | / | / | 31 | 28.0 | / | 0.48 | 0.63 |

*calcinations in air

The invention claimed is:

1. Mixed oxide of aluminum, of zirconium, of cerium, of lanthanum and optionally of at least one rare-earth metal other than cerium and lanthanum, the proportions by weight of these elements, expressed as oxide equivalent, with respect to the total weight of the mixed oxide being as follows:
   between 27% and 33% of aluminum;
   between 24% and 32% of cerium;
   between 3% and 6% of lanthanum;
   between 3 and 6% for the rare-earth metal other than cerium and lanthanum, on condition that if the mixed oxide comprises more than one rare-earth metal other than cerium and lanthanum, this proportion applies to each of these rare-earth metals and that the sum of the proportions of these rare-earth metals remains less than 15%;
   between 31% and 37% of zirconium;
   characterized by the following properties obtained after each independent calcination treatment obtained from a composition
   after having been calcined at a temperature of 1100° C. for 5 hours:
      the x-ray diagram of the mixed oxide has, for the crystalline phase composed of cerium zirconium oxide, only a single peak, the maximum of which is located at a 2θ angle of between 28° and 32°;
      the average size of the crystallites of the crystalline phase composed of cerium zirconium oxide is at most 20 nm;
      the BET specific surface area of the mixed oxide is at least 35 m²/g;
   and in that after having been calcined at a temperature of 950° C. for 4 hours:
      the pore volume of the mixed oxide, developed by the pores, the size of which is less than or equal to 100 nm obtained from the nitrogen porosimetry data is greater than or equal to 0.35 mL/g;
      the total pore volume of the mixed oxide, obtained from mercury porosimetry data, is less than or equal to 2.0 mL/g,
      the BET specific surface area of the mixed oxide is at least 75 m²/g, and
      a powder bulk density of greater than or equal to 0.25.

2. Mixed oxide according to claim 1, further comprising hafnium.

3. Mixed oxide according to claim 2, characterized in that the proportion by weight of hafnium in the mixed oxide is less than or equal to 2.0%, expressed as oxide equivalent with respect to the total weight of the mixed oxide.

4. Mixed oxide according to claim 1, characterized in that the rare-earth metal other than cerium and lanthanum is chosen from yttrium, neodymium or praseodymium.

5. Mixed oxide according to claim 1, characterized in that the total proportion of zirconium and of aluminum expressed in oxide form is greater than or equal to 50%.

6. Mixed oxide according to claim 1, having a ratio R<1.0 after calcination at 1100° C. for 5 hours, R being determined from x-ray diffraction data, by the formula below:

$$R = \frac{I\ Al2O3}{I\ CZ} \times \frac{100}{Al2O3\ wt\ \%}$$

in which:
   $I_{Al2O3}$ denotes the intensity of the signal of the gamma-alumina, the maximum of which is located at the 2θ angle=67°±1;
   $I_{CZ}$ denotes the intensity of the signal of the crystalline phase composed of cerium zirconium oxide, the maximum of which is located at a 2θ angle of between 28° and 32°;
   $Al_2O_3$ wt % denotes the proportion by weight of aluminum expressed as oxide equivalent.

7. Mixed oxide according to claim 1, characterized in that the mixed oxide is in the form of a powder having a mean diameter $d_{50}$ of between 1.0 and 50.0 μm, $d_{50}$ being determined by laser diffraction over a volume distribution.

8. Mixed oxide according to claim 1, characterized in that the pore distribution of the mixed oxide after calcination 950° C. for 4 hours, determined by mercury porosimetry, has, in the domain of the pores having a diameter of less than 100 nm, a peak with diameter at the peak $D_p$ of between 10 and 30 nm.

9. Process for preparing a mixed oxide according to claim 1, the process comprising:

(a1) introducing an acidic aqueous solution of precursors of cerium, of zirconium, of lanthanum and optionally of a rare-earth metal other than cerium and lanthanum, in which an aluminum hydrate is dispersed, into a stirred tank containing a basic aqueous solution to form a precipitate dispersion;
(a2) optionally heating the precipitate dispersion;
(a3) adding a texturing agent to the precipitate dispersion;
(a4) recovering solid from the precipitate dispersion by solid/liquid separation and optionally washing the solid;
(a5) optionally drying the solid;
(a6) calcining the solid at a temperature of between 700° C. and 1100° C. to result in the mixed oxide;
(a7) optionally grinding the mixed oxide.

10. Process according to claim 9, wherein the solution of precursors is prepared only from precursors in the form of nitrates or else in the form of chlorides.

11. Composition comprising the mixed oxide according to claim 1 as a mixture with at least one mineral material.

12. Composition according to claim 11, in which the mineral material is chosen from alumina, titanium oxide, cerium oxide, zirconium oxide, silica, spinels, zeolites, silicates, crystalline silicon aluminum phosphates or crystalline aluminum phosphates.

13. Catalytically active washcoat, deposited at the surface of a solid support, prepared from the mixed oxide as described in claim 1.

14. Catalytic converter for treating motor vehicle exhaust gases, comprising a washcoat according to claim 13.

15. A method for preparing a catalytic converter, the method comprising using a mixed oxide according to claim 1.

16. Process for treating exhaust gases from internal combustion engines, characterized in that use is made of a catalytic converter comprising a washcoat according to claim 13.

* * * * *